INVENTOR.
HENRY L. ARCE
JACK L. WHITENER
BY
ATTORNEY

INVENTOR.
HENRY L. ARCE
JACK L. WHITENER

INVENTOR.
HENRY L. ARCE
JACK L. WHITENER

United States Patent Office 3,465,221
Patented Sept. 2, 1969

3,465,221
COMPASS CARD AUTOPILOT WITH 360 DEGREE DIRECTIONAL CONTROL
Henry L. Arce, Huntington Park, and Jack L. Whitener, Los Alamitos, Calif., assignors, by mesne assignments, to Ametek, Inc., New York, N.Y., a corporation of Delaware
Filed Jan. 23, 1967, Ser. No. 610,916
Int. Cl. H02p 1/54, 5/46, 7/68
U.S. Cl. 318—18                                          8 Claims

ABSTRACT OF THE DISCLOSURE

An autopilot which is unidirectionally responsive throughout the entire 360 degree field and which is well suited for a corrosive marine environment because of an entirely transistorized motor control circuit. The course setting unit uses a pair of photocells with an eccentrically mounted compass card to modulate light reception by the photocells and electric signal feedback attains proportional control. Complementary, bistable, multivibrator circuits are used to control the switching of the motor control transistors.

Description of the invention

This invention relates to automatic navigation systems for mobile craft and in particular relates to an automatic directional control system for marine craft.

A variety of autopilots have been developed for marine craft which employ compasses or other earth magnetic field pickup devices. Of these, the inexpensive autopilots have employed compass units with various error signal generators. One type employs a photocell with a light source and a sectored compass card mounted between the light source and photocell to interrupt the light beam and thereby register off-course positions. These control units have heretofore either employed no control feedback and exhibited a hunting action or have used a mechanical feedback linkage to impose the rudder position on the control unit and thereby avoided over controlling. The use of a mechanical linkage to impose the rudder position complicates the installation of the autopilot and often requires that the directional sensing unit, i.e., compass, be mounted near the rudder control unit. The aforementioned autopilots have often not been provided with course control throughout the entire 360° field, but are often limited to sensitivity through a 180° field and sometimes only 120°–90° fields. This results in two to four possible courses for each setting of the autopilot. Other disadvantages of the conventional autopilots include a high maintenance requirement that results from the use of mechanical switches in a corrosive marine environment.

It is an object of this invention to provide a marine autopilot which permits the location of the directional sensing and source setting unit at any point remote from the rudder control unit.

It is an object of this invention to provide a directional sensing unit for a marine autopilot having a directional course detection and control throughout a 360° field.

It is an object of this invention to provide a rudder motor circuit having no mechanical contact switches.

Other and related objects will be apparent from the following description of the invention.

The preceding objectives are obtained by this invention which comprises a directional sensing unit and a rudder control unit responsive thereto with electical feedback to the sensing unit. The directional sensing unit utilizes a compass card that is uniquely positioned with respect to light beams and light responsive detectors so that the unit is directionally responsive throughout a 350° field. The rudder control unit employed in the invention is a completely transistorized circuit having no relays or mechanical switches, thereby eliminating switch contacts which heretofore have been a major maintenance item in marine autopilots.

The invention will now be described by reference to the figure of which:

Figure 1:
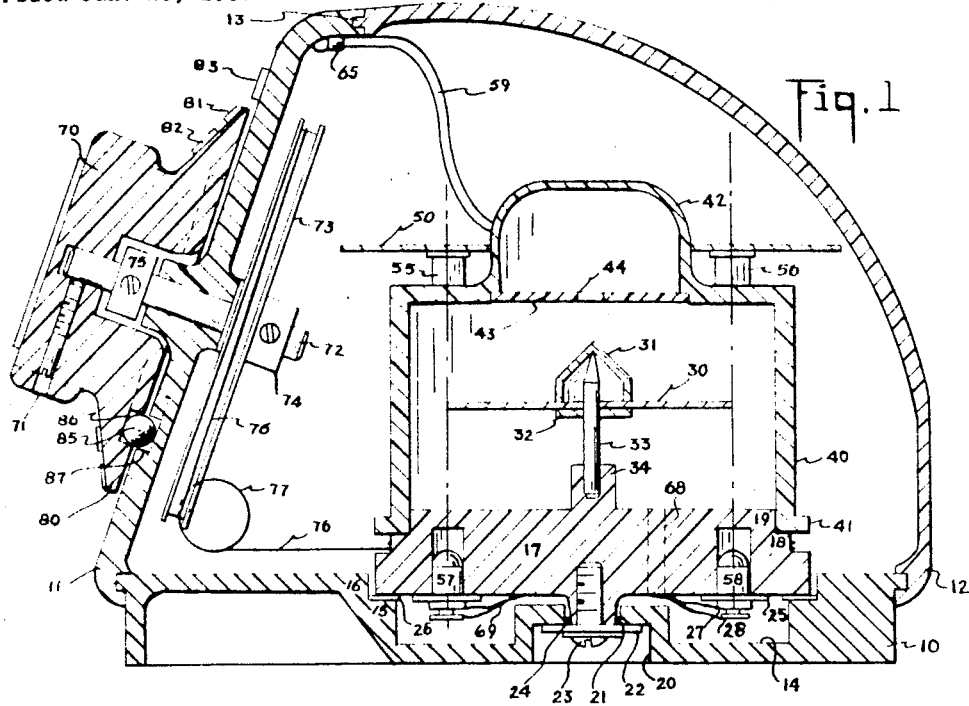
FIGURES 1 and 2 illustrate the course sensing and setting unit of the marine autopilot of the invention.
Figure 2:
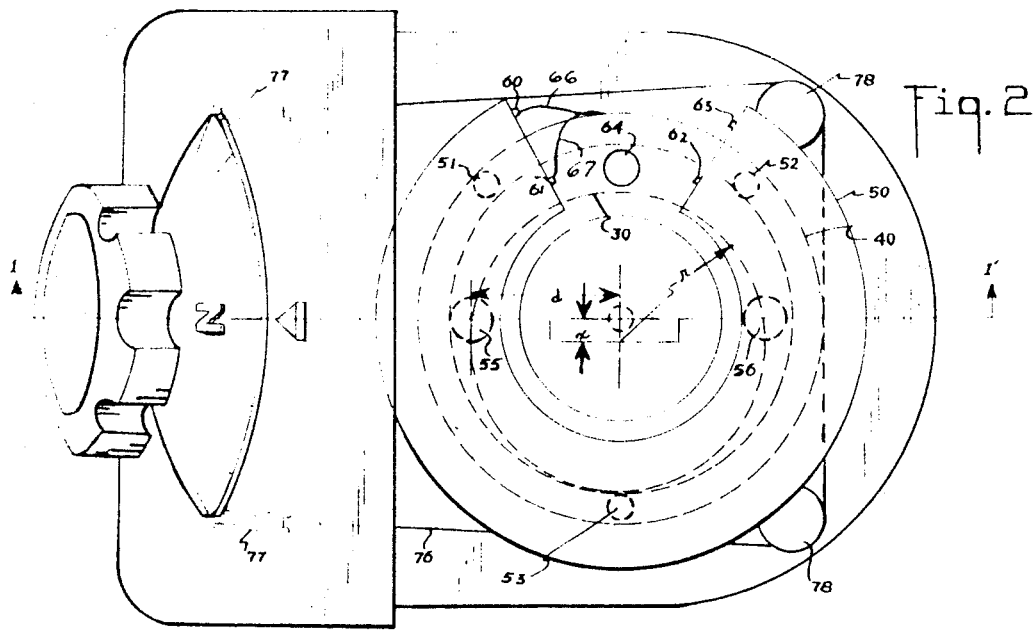

Referring now to FIGURE 1, the directional or course sensing and setting unit of the autopilot is shown in vertical section along line 1–1' of FIGURE 2. The unit is contained within a housing that comprises base 10 with front plate 11 and rear cover 12. The lower edges of the plate and cover engage a lip on the base and mate together along a tongue and groove joint 13. The base 10 can be formed of metal and is secured to the marine craft while the front plate 11 and cover 12 are preferably molded from plastic such as polystyrene, Lucite, Bakelite, etc. The upper surface of base 10 has an annular groove 14 and a circular cut 16 is milled about the periphery of 14 to provide shoulder 15. The bottom of base 10 is bored at 21 and counterbored at 20. This construction provides a seat for the compass unit that has a circular base 17 with two circumferential grooves about its upper surface, thereby forming shoulders 18 and 19. Plate 17 is also formed from a clear plastic such as Lucite.

The compass plate 17 is rotatably mounted on base 10 with a central boss 25 that extends into bore 21 of base 10. The periphery of plate 17 rests in sliding engagement with shoulder 15 of base 10 and a fiber washer 26 is placed between the base 10 and plate 17 to seal this joint. Boss 25 is tapped and a machine screw 23 and washer 22 are used to retain the plate 17 on base 10.

The compass card 30 has a metal cap 31 centrally mounted thereon and a permanent magnet 32 is attached to the underside of the card 30. The card assembly is placed on a pivot point comprising pointed shaft 33 that extends through a center hole in the card 30. Shaft 33 is supported in boss 34 on the upper surface of plate 17. The compass card assembly is shown in cross section in FIGURE 1; note however, that the section view through this assembly is offset by a distance $x$ from the centerline of the unit as shown in FIGURE 2. In the embodiment as shown in FIGURES 1 and 2, the compass card has a diameter $d$ and is offset from the centerline of the unit by a distance $x$ such that its outer periphery is tangent to each of the centerlines passing through light 58 and photocell 56 and light 57 and photocell 55.

The compass card is supported within a liquid bath to dampen movement of the card in the conventional manner. An inverted cap 40 having a flange 41 about its lower edge is placed over plate 17 and in engagement with upper groove 19 of this plate. Cap 40 has a dome 42 centrally molded into its upper surface and this dome provides an air space above the liquid level to accommodate for changes in ambient temperatures. A plate 43 is supported across the bottom of the dome 42 with a small diameter hole 44 to dampen movement of the liquid in cap 40.

A printed circuit board which supports the circuit for the course sensing and setting unit (see FIGURE 1) is mounted directly above cap 40 on bosses 51, 52 and 53, shown in FIGURE 2. The circuit board supports, on its undersurface, light detectors 55 and 56 which, preferably, are photo resistant elements. These photocells are arranged directly above and, hence, at equal distances from lights 57 and 58 that are mounted in tapped recesses in plate 17. A cable 59 of four conductors is supported at the top of the unit by clip 65. This cable connects to terminals 60–63 of the circuit board. Terminals 60 and 61 are the positive and negative terminals of the circuit board and leads 66 and 67, shown in FIGURE 2 are extended from these terminals to lights 57 and 58. The leads enter the annular groove 14 through slot 68 cut in plate 17 and then extend as shown at 69 to the terminals 28 and 27. The light bulbs are retained in place by a brass washer 25 and brass terminals 28 and 27 that are secured to plate 17.

To permit the sensing unit to be used for course setting, means are provided to rotate plate 17 about its pivot on base 10. This comprises knob 70 secured to shaft 72 with set screw 71. Inside the unit housing, shaft 72 supports pulley 73 and the assembly is retained on the plate 11 by collars 74 and 75. A flexible cord 76 is passed about pulley 73 and this cord extends to and around plate 17 along the groove formed by flange 41 of cap 40 and shoulder 18 on plate 17. FIGURE 2 illustrates the cord and associated pulleys 77 and 78 in greater detail.

Knob 70 has a lower flange 80 with a calibrated scale 81 and numerals 82 in raised relief on its surface. A course indicator or "lubber line" 83 is provided on face plate 11. Knob 70 is permitted to rotate through 370° to 390°; complete freedom of movement being checked by a stop comprising bearing 85 that is retained between matching circular grooves 86 and 87 in the opposing faces of knob 70 and face plate 11, respectively. Groove 86 extends approximately 350° about the under surface of knob 70 while groove 87 extends approximately 20° to 40° about the outer surface of face 11.

FIGURE 2 shows the compass card and light detector arrangement of the invention. Briefly, this arrangement utilizes a circular compass card that is mounted slightly off center from the centerline between the photocells so that rotation of the photocells about their axis of rotation will expose each of the photocells to a constantly modulated beam of light. In this manner, a continuous error signal is produced throughout the entire 360° of rotation. The compass card 30 is shown to have a radius $r$ and to have an axis of rotation that is offset a distance $x$ from the straight line intersecting each of photocells 55 and 56. This line is the edge of an imaginary plane which also passes through lights 57 and 58 since the photocells are preferably mounted at points that are equidistant from the lights. The compass card 30 is shown to be substantially tangent to the inside surface of the cap 40 at its lower edge in FIGURE 2. These surfaces thereby define an unrestricted light path through the circular crescent region formed between the outer edge of compass card 30 and the upright surface of the inner wall of cap 40. The use of two photocells located symmetric to a light source and equidistant from the eccentrically located axis of rotation of the compass card eliminates spurious signals that would otherwise be caused by pitch and roll of the craft in a non-symmetrical system.

Figure 3:
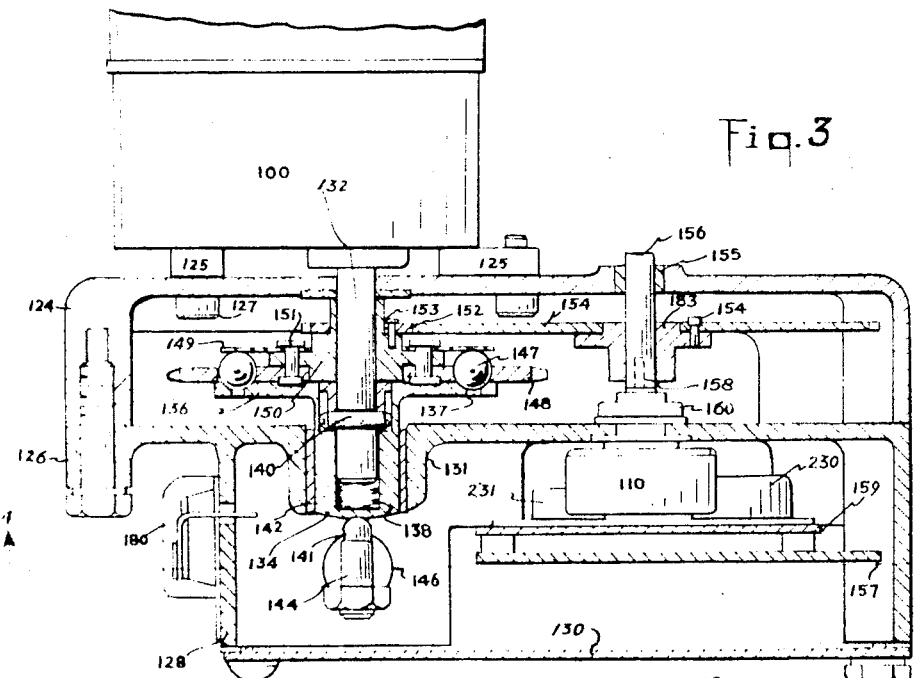
FIGURES 3, 4 and 5 illustrate the rudder control unit of the autopilot.
Figure 4:
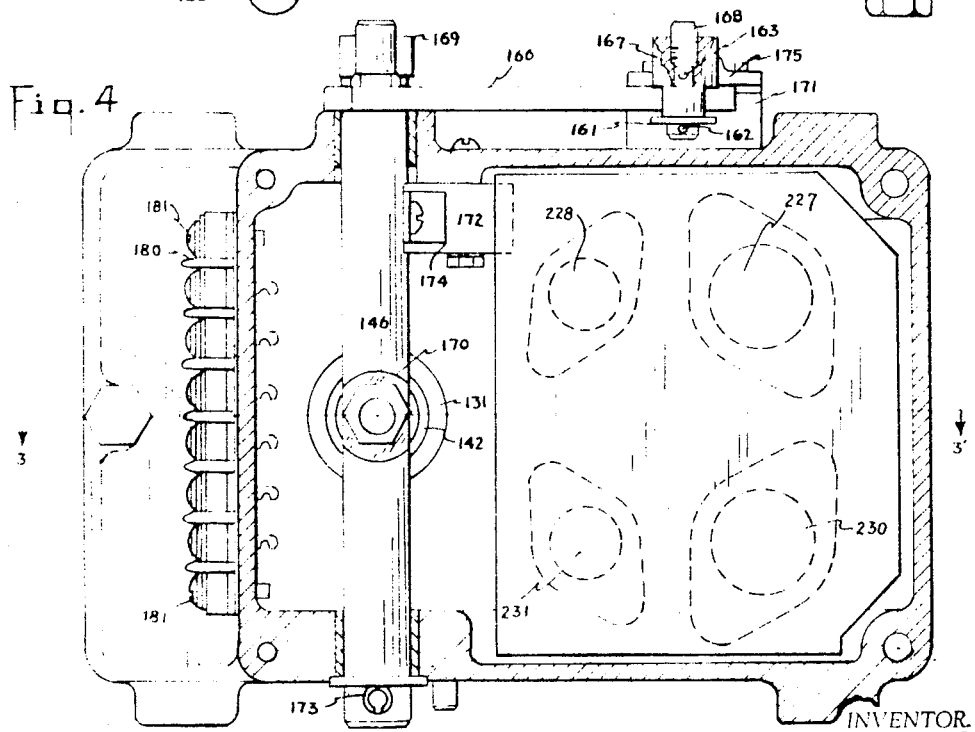
Figure 5:
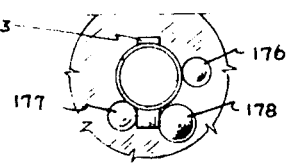

FIGURES 3, 4 and 5 illustrate the motor control unit. A rudder control motor 100 is secured to housing 124 by lugs 125 and bolts 127. A mating plate 126 forms the other half of the housing and the outside surface of this plate has an upstanding wall 128 which provides a second chamber that is covered by plate 130. The motor drive shaft 132 extends through the housing and into a hub 131 that projects into the second chamber. The end of the drive shaft is capped by a clutch driver 134 which is a cylindrical cap having radial arms 136. At the outboard ends of arms 136 are recesses 137. The driver is biased outwardly from the end of the drive shaft by spring 138 contained within the cylindrical cap. A pin 140 fits within a radial groove contained within the cylindrical cap to permit shaft 132 to impose rotational force upon the cap. The cap is slidably mounted in the housing 126 with sleeve bearing 142. The driver can be moved axially on shaft 132 by cam pin 144 and is biased against driver 134 by spring 138. Rotation of shaft 146 thus forces the driver unit axially towards motor 100 until the recesses 137 engage balls 147 that are supported in sprocket 148 and that are biased against 137 by leaf spring 149. Sprocket 148 is secured to hub 150 by rivets 151. Drive gear 152 is attached to hub 150 with screws 153. Gear 152 meshes with the rudder drive gear 154 which is secured to hub 153 by screws 154 and this hub is supported on shaft 156 that extends through sleeve bearing 155.

Shaft 156 has a center bore into which is fitted shaft 158 of potentiometer 110. The potentiometer is secured to the housing by retaining nut 160. The control circuit for the motor is on printed circuit board 157. The power transistors 227, 228, 230 and 231 that serve as switches for the circuit are shown mounted on plate 159 which serves as a heat sink in the conventional manner.

FIGURE 4 is an illustration of the motor control unit along line 4–4′ of FIGURE 3. This view shows clutch lever 166 that is secured to shaft 146 by lock nut 169. The opposite end of clutch lever 166 is bored and fitted with a cable retainer 167 which is secured to the lever by washer 161 and pin 162. A set screw 168 locks a cable within bore 163 and this cable extends to a suitably positioned clutch lever in the craft cockpit. Bracket 171 supports a cable guide 175 on the lower edge of the unit housing.

Figure 6:
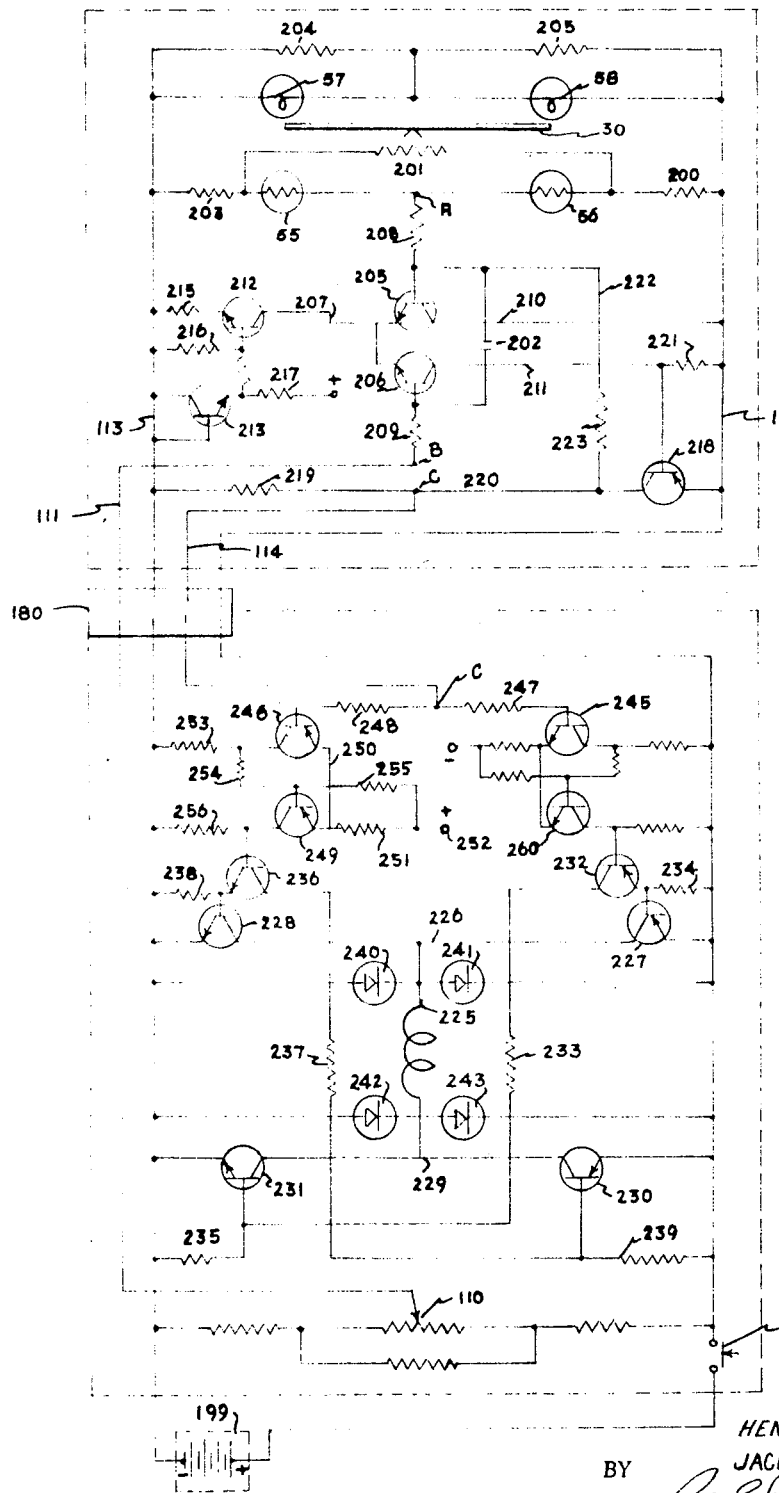
FIGURE 6 illustrates the circuitry of the autopilot.

Shaft 146 has a segmented portion 170 through which cam pin 144 extends. Microswitch 172 which activates the autopilot circuit described in FIGURE 6 is mounted within the second cavity of the housing and is engaged by angle switch actuator 174 that is also attached to shaft 146. In this manner, engagement of the clutch by movement of lever 166 activates the autopilot and engages the rudder control motor 100. The shaft 146 is retained in either of two positions by detents 176 and 177 and bearing 178. These are illustrated in FIGURE 5 which shows a limited area of the side wall 128 about the end of shaft 146. Pin 173 in the end of shaft 146 is retained between detents 176 and 177 and bearing 178 is positioned within a socket in wall 128 to project above the surface of this wall against pin 173. A spring, not shown, is recessed within the socket to bias the bearing outwardly to provide a yielding retainer for pin 173.

The autopilot control circuit comprises two circuits; a voltage comparator circuit that develops an error signal in response to movement of the craft off course and a rudder control motor circuit that receives the output of the comparator circuit and actuates the rudder motor in response thereto. The error signal generator circuit is on the circuit board 50, the motor control circuit is on board 157. The connections between the circuits are made through terminal barrier strip 180 which is secured to the housing by screws 181 and which provides six terminals to connect the voltage supply leads and the four connectors for the course sensing and setting unit.

Referring now to FIGURE 6, the error signal generator of the course sensing and setting unit comprises a differential voltage comparator circuit; a current regulating circuit to provide a source of constant current for the comparator circuit; and a voltage divider circuit utilizing photocells 55 and 56. The photocells are passive photo resistance elements and are connected across the positive and negative leads of the supply voltage using resistors 200, 201 and 203 to obtain the desired voltage drop across the photocells. The photocells pairs are calibrated in each unit by adjusting the value of resistance 201 with a decade box until the circuit registers a predetermined output voltage for a preset error, e.g., the value of 201 is adjusted to obtain an error signal of plus or minus 1 volt with an off-course setting of plus or minus 30 degrees.

The photocells are spaced about equidistant from their respective lights 57 and 58 and compass card 30 is placed to modulate the incident light from 57 and 58. The resistors 204 and 205 are connected in parallel across the supply voltage to adjust the voltage drop across each of the lights. When the craft is on course, photocells 55 and 56 comprise a null or balanced circuit and the voltage at point A is one half the supply voltage, e.g., 6 volts.

The differential voltage comparator circuit compares the voltage at point A to the voltage at point B, which is a feedback voltage that reflects the rudder position. Rudder feedback is achieved by potentiometer 110 which is connected to point B by lead 111 that extends to a terminal of barrier strip 180. The voltage comparator circuit comprises transistors 205 and 206 that have a common emitter lead 207 and that have their base junctions connected through resistors 208 and 209 to points A and B respectively. Capacitor 202 is connected across the bases of transistors 205 and 206 as a low pass filter to suppress any transient spikes in the voltage supply that can occur during operation of the rudder motor.

Leads 210 and 211 connect the collector junctions of transistors 205 and 206 respectively to the positive supply lead 112. The emitter lead 207 is connected to the collector junction of transistor 212. This transistor is in the constant current regulating circuit comprising transistor 213 and resistors 215, 216 and 217. Transistor 212 is operated in the breakdown region of the base-emitter diode and functions as a Zener diode to provide a constant voltage across its terminals over a large range of currents. This assures constant current flow through the emitter lead 207 regardless of variations in the supply.

The output signal of the circuit is developed at C in lead 220 that connects resistor 219 to the collector of transistor 218. Lead 114 connects the output to point C of the motor control circuit. Resistor 219 and the emitter junction of transistor 218 are connected to the negative lead 113 and positive lead 112, respectively, from battery 199, and are sized so that at null, the voltage at C is approximately half the supply voltage, e.g., 6 volts. The base junction of transistor 218 is connected to one of the collector junctions of transistors 205 or 206, connection to the collector of 206 being illustrated. A biasing resistor 221 is placed between this connection and the positive voltage supply to operate transistor 218 in the modulating region. To control the gain through the error signal generator, a feedback connector 222 is connected from the circuit output lead 220 to the inputs at the base junctions of transistors 205 and 206. This permits the gain through the circuit to be controlled to substantially the ratio of resistance 223 to the resistance of either 208 or 209.

The rudder control circuit is located on circuit board 157 and all switching is performed by transistors which are operated with forward bias in a saturated condition. The use of transistors for the switching eliminates a major maintenance item from the autopilot, i.e., contact points of mechanical switches that are subject to rapid corrosion in salt air. The motor winding is shown as 225 in FIGURE 6 with one of its terminals connected to a common collector lead 226 of power transistors 227 and 228 which are of opposite conductivity type. The opposite terminal of the winding 225 is connected to a second common collector lead 229 of power transistors 230 and 231 which are also of opposite conductivity type. The power transistors are preferably of germanium. The base of transistor 227 is connected to the emitter of 232 while the base of transistor 231 is connected to the collector of transistor 232 through resistor 233. Resistors 234 and 235 are used to forward bias transistors 227 and 231, respectively. Transistors 236 and resistors 237, 238 and 239 are used in a similar configuration with transistors 230 and 228. Diodes 240, 241, 242 and 243 are used to divert any reverse voltages that may be developed in the motor winding during switching of the current therethrough, thereby protecting the power transistors.

The balance of the rudder control circuit comprises two complementary multivibrator circuits; preferably two Schmitt trigger circuits. These circuits utilize a regenerative feedback to achieve rapid switch action that prevents the power transistors from operating in the active or modulating region. The input to the control circuit is voltage C which is applied to the base of transistors 245 and 246 through 247 and 248, respectively. Transistors 246 and 249 have a common emitter lead through resistor 251 to positive terminal 252. The collector of 246 is connected to the negative voltage supply from battery 199 through resistor 253 and the base of 249 is connected to positive terminal 252 through resistor 255 and to the collector of 246 through resistor 254. Resistor 256 is provided to bias transistor 236.

The output of the Schmitt trigger circuit is connected to the base of transistor 236 which is connected to the negative supply voltage with biasing resistor 238. The complementary Schmitt trigger circuit has transistors 245 and 260 which are of opposite conductivity type to 246 and 249.

The Schmitt trigger circuits are designed so that half the supply voltage, e.g., 6 volts, appearing at C is sufficiently negative to maintain transistor 246 at saturation and sufficiently positive to maintain transistor 245 at saturation. With transistor 246 at saturation. transistor 249 is cutoff and remains at cutoff until the voltage at C increases to a predetermined value, e.g., 8 volts. This increase in supply voltage decreases the base potential of 246, thereby increasing its reverse bias. This causes the collector voltage of 246 to become more negative, decreasing emitter current and decreasing the IR drop across resistor 251. The base of 249, connected to the collector of 246, becomes more negative and this effect with the decreased IR drop across 251 reduces the reverse bias on 249, causing it to operate at saturation. The reverse action occurs at a second predetermined signal voltage, e.g., 7 volts which overcomes the reverse bias of 246, causing the latter to conduct and thereby making the base voltage of 249 more positive. The emitter voltage of 249 decreases and the IR drop across 251 again decreases and the emitter of 246 becomes less negative until 246 is at saturation and 249 is at cutoff.

Effects exactly opposite to those previously described occur in the complementary Schmitt trigger circuit at predetermined voltages, e.g., transistor 245 is at saturation and 260 is at cutoff for all signal voltages above 5 volts while transistor 245 is at cutoff and 260 is at saturation at all voltages below 4 volts. This design provides a dead band in the signal voltage of a predetermined magnitude, e.g., between 5 and 7 volts and thereby avoids excessive rudder action. The hysteresis between the activating and deactivating voltages also insures that only one of the opposed transistor pair, i.e., only one of transistor pairs 227 and 228 and only one of transistor pairs 230 and 231 will be conducting at any single instant, thereby insuring against shorting the voltage supply through an open transistor pair.

The operation of the autopilot will be relatively apparent from the preceding description of the control circuit and the components employed therein. The circuit has a null position in which the respective photocells receive approximately equal incident light from light sources 57 and 58. When the craft departs from its set course, the photocells are rotated with respect to the compass card and travel along the crescent shaped gap between the compass card and the inside wall of housing 40. This movement modulates the light beam from the elements 57 and 58 to the photocells 55 and 56. This modulation occurs because one light and photocell pair moves to a point on the crescent gap where it receives more light while the other light and photocell pair moves to a point on the gap where it receives less light. Since the photocells change resistance with light intensity, the two photocells form a voltage divider across the supply voltage. At null, the voltage at the junction of the photocells, point A, will be 6 volts. In an off-course condition, this voltage will either be above or below 6 volts as determined by the direction of the off-course heading.

The voltage at point A is compared with the voltage at B which is derived from the rudder position potentiometer 110. This voltage would also be 6 volts if the craft were running on course. The constant current supply through transistor 212 insures that changes in the voltage divider do not alter the total current flow through the voltage comparator transistors 205 and 206, but rather, only the distribution of current through these transistors is changed as a result of changes in the input voltages connected to the base junctions of these transistors.

If the craft departs from the set course, the voltage at point A will change, e.g., will increase to a value greater than the voltage at B. Transistor 205 will then conduct more than 206 and current will be diverted from the collector of 206 that supplies base current to 218. The collector current of 218 will be reduced and the collector voltage of 218 which appears at point C will decrease. When the voltage at C has decreased sufficiently, the motor drive of the rudder control circuit will be activated and the craft will be directed towards an on course position. Concurrently with the change in rudder position is a change in the wiper of potentiometer 110 which increases the feedback voltage that appears at point B and opposes the error signal voltage at A. In this manner the error signal voltage and the feedback voltage follow each linearly, in a proportional manner. As the craft returns to the on course position, the error signal voltage decreases and the rudder is returned to a straight position. In such a system, there is no tendency to overshoot since the rudder is at zero displacement when the error is zero.

The output signal from the course sending and setting circuit is used to control the rudder control circuit by activation of one or the other of a pair of complementary bistable multivibrator circuits that actuate transistors in the switching circuit to the winding of the rudder motor. The multivibrator circuits are two Schmitt rtigger circuits that employ transistors of opposite conductivity type. The NPN trigger circuit, transistors 245 and 260 will turn on if the voltage at C is 4 volts or less and will turn off if the voltage is 5 volts or more. The PNP trigger circuit, transistors 246 and 249 will turn on if the voltage at C is 8 volts or more and will turn off if the voltage is 7 volts or less. The size of the deadband that results from the hysteresis type actuation is important for the proper functioning of the autopilot. A deadband of no rudder response is placed about the null position of the autopilot and the size of this deadband is chosen sufficiently large that the inertia of the control circuit will not activate the circuit. To determine the size of the deadband, the rudder motor is activated momentarily and the degree of movement that occurs as the motor coasts to a stop is measured and the deadband is sized sufficiently large so that this degree of rudder movement that results from the inertia of the control motor does not activate the Schmitt triggers. In the illustration herein, this deadband comprises plus or minus 2 volts.

When the craft is off-course and the voltage at C rises to 8 volts or greater, the PNP trigger circuit is activated which drives transistor 236 into a saturated condition, causing transistors 228 and 230 to be forward biased into saturation in a snap fashion and a circuit is completed through these transistors and the motor winding of the rudder motor. The rudder is then moved into a corrective position, the feedback voltage that appears at B in the sensing unit circuit opposes the error signal and causes the rudder to return to the normal position as the craft returns to the set course. This occurs because as the craft returns to the set course the error signal appearing at A becomes less than its original or activating value and is exceeded by the feedback voltage at B. When the difference between these voltages is sufficient to activate the NPN circuit, the rudder is moved towards its normal or straight position. Exactly the opposite sequence of events occurs when the error signal that originally appears at C is 4 volts or less.

The preceding illustration of the autopilot is intended only to illustrate the best mode of practice of the invention. It is not intended that the invention should be unduly limited to the exact circuits and system described, but instead it is intended that the invention be defined by the means and their obvious equivalents set forth in the following claims.

We claim:

1. A directional sensing unit for a mobile craft that comprises: at least one light source, two light detectors mounted on a common support and positioned at points symmetric to said light source, a circular compass card pivotably supported between said source and said detectors transverse to the light path from said source and on an axis equidistant from each of said detectors and eccentric to a point mid-way between said detectors, so located that at least one point on the periphery of said card is substantially tangent to imaginary straight lines between said source and said detectors; and means securing said support to said craft.

2. The unit of claim 1 wherein said light source comprises two visible light emitters, each located substantially opposite one of said detectors.

3. The unit of claim 1 wherein said light source, compass card and common support are mounted within a housing including means to set a directional course that comprises means affixing said housing to said craft while permitting rotation of said housing.

4. The unit of claim 1 wherein said light detectors are photoconductors that change resistance in response to varied light reception in combination with means to measure the change in resistivity of said photoconductors and to generate an error signal in response thereto.

5. The unit of claim 4 wherein said means to measure comprises a positive voltage supply lead connected to one junction of one of said photoconductors, a negative voltage supply lead connected to one junction of the other of said photoconductors and an output signal lead connected to the remaining junctions of both of said photoconductors.

6. The unit of claim 5 in combination with means on said craft to generate a feedback signal responsive to the position of the rudder of said craft, means to compare said error signal and said feedback signal and to generate a net error signal in response thereto.

7. The combination of claim 6 with a rudder motor and a control circuit therefor that comprises positive and negative voltage supply leads, a first pair of semiconductors connected from opposite terminals of the winding of said motor to one of said leads, a second pair of semiconductors of opposite conductivity type to said first pair also connected from opposite terminals of said winding to the other of said leads, means to forward bias each of said semiconductors into a saturated state including a fifth semiconductor connected to actuate the forward bias of one of said first pair of semiconductors and the one of said second pair of semiconductors that is connected to the opposite terminal of said winding and a sixth semiconductor connected to actuate the forward of the two remaining semiconductors of said first and second pairs, two bistable multivibrator circuits of semiconductors of opposite conductivity type, each circuit having its output lead connected to forward bias one of said fifth and sixth semiconductors, and means to apply said net error signal to the input of both of said multivibrator circuits.

8. The control circuit of claim 7 wherein both of said multivibrator circuits are in a stable off state at an on-course input signal, wherein one of said multivibrator circuits switches to a stable on state at an input signal greater than said on-course signal by a differential equal to a predetermined value and the other of said multivibrator circuits switches to a stable on state at an input signal lesser than said on-course signal by a differential equal to said predetermined amount and wherein each of said circuits reverts to a stable off state when said signal differential is less than a second predetermined value.

References Cited

UNITED STATES PATENTS

| | | | |
|---|---|---|---|
| 2,182,696 | 12/1939 | Janeway | 318—31 |
| 2,182,717 | 12/1939 | Chance | 318—31 |
| 3,217,170 | 11/1965 | Bin-Lun Ho | 318—28 XR |
| 3,117,266 | 1/1964 | Raymond | 318—480 XR |

BENJAMIN DOBECK, Primary Examiner

U.S. Cl. X.R.

250—203; 244—77; 318—480